Nov. 22, 1960  H. PLUMMER  2,960,824
ROCKET STARTER FOR GAS TURBINE
Filed Aug. 1, 1955  2 Sheets-Sheet 1
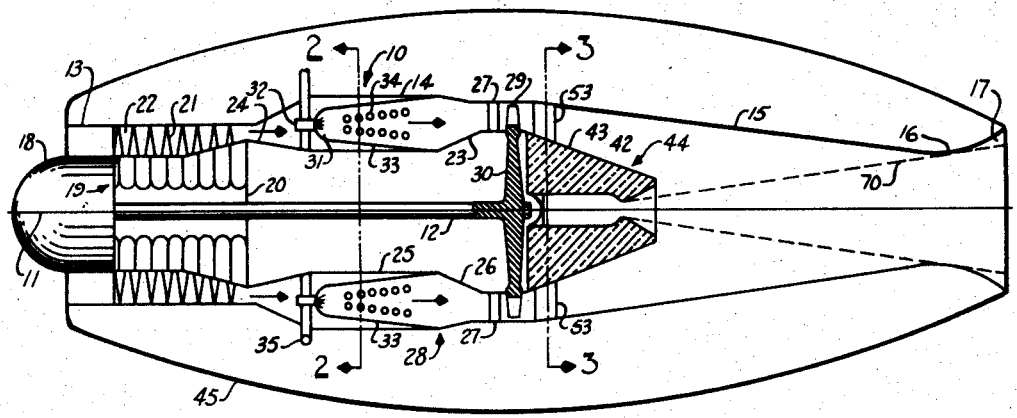
Fig-1
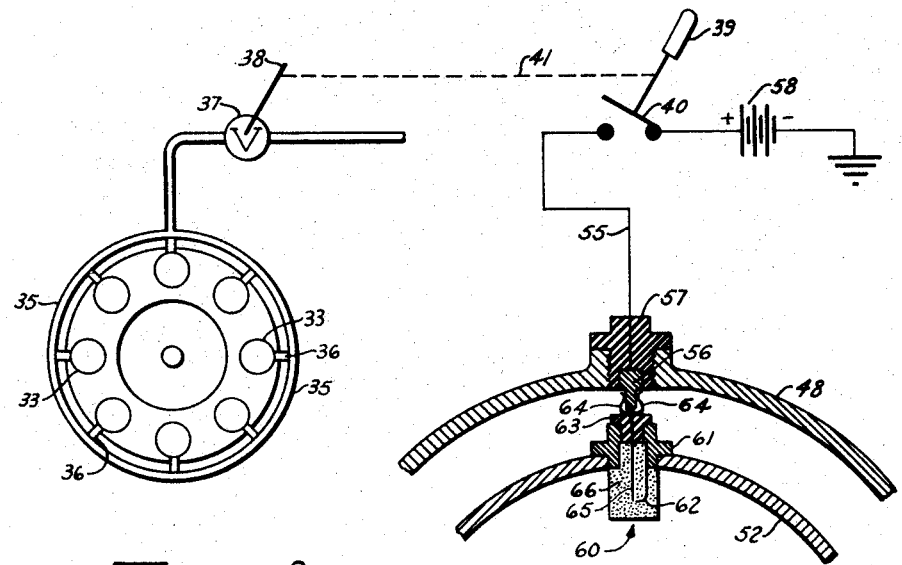
Fig-2
Fig-6
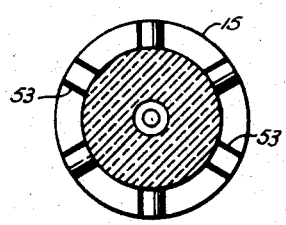
Fig-3
H. PLUMMER
INVENTOR.
BY S. Tierney, Jr.
ATTORNEY Nov. 22, 1960

H. PLUMMER 2,960,824

ROCKET STARTER FOR GAS TURBINE

Filed Aug. 1, 1955

2 Sheets-Sheet 2

H. PLUMMER
INVENTOR.

BY S. Tierney, Jr.
ATTORNEY

United States Patent Office 2,960,824
Patented Nov. 22, 1960

2,960,824

ROCKET STARTER FOR GAS TURBINE

Harold Plummer, La Jolla, Calif., assignor to Rohr Aircraft Corporation, Chula Vista, Calif., a corporation of California Filed Aug. 1, 1955, Ser. No. 525,461

5 Claims. (Cl. 60—39.14)

This invention relates to the use of a solid propellant fuel charge for substantially increasing the air supply and also the flow of exhaust gas through the tail pipe of a gas turbine engine at starting.

Rocket assists in the form of Jato bottles mounted on airplanes at points remote from the jet engines have been used to accelerate the plane at take-off. When such a rocket is used at starting, the drag or work of forcing air through the turbine has to be first overcome by the rocket so that a substantial delay results before the gas turbine becomes efficient and overcomes its own starting air drag. The gas turbine therefore does not assist the rocket efficiently until after the airplane has reached take-off speed.

According to my invention, the rocket is placed centrally inside the upstream end of the tail pipe and is fired at the same time that the turbine is started so very quickly thereafter the thrust from the turbine exhaust assists the rocket in securing take-off before the airplane reaches its maximum speed. This provides a more rapid acceleration of the airplane so that a shorter runway is required for take-off.

An object of the invention is the provision of a rocket unit in place of the conventional turbine starting unit, which can easily be placed and fastened in position in the upstream end of a jet engine tailpipe.

A further object is to provide a hollow support in the tailpipe to insulate, enclose and support a container in which the propellant charge is disposed, the container having one or more filling openings through which a second charge may be inserted after the first has been fired.

Another object is the provision of an electrical circuit for firing the charge, the circuit including a pair of contacts which are automatically brought into engagement with each other when the rocket unit is inserted in the tailpipe.

Another object is to provide a single control means located at a place convenient to the pilot for simultaneously firing the rocket and turning on the fuel for the fuel nozzles of turbine.

Figure 4:
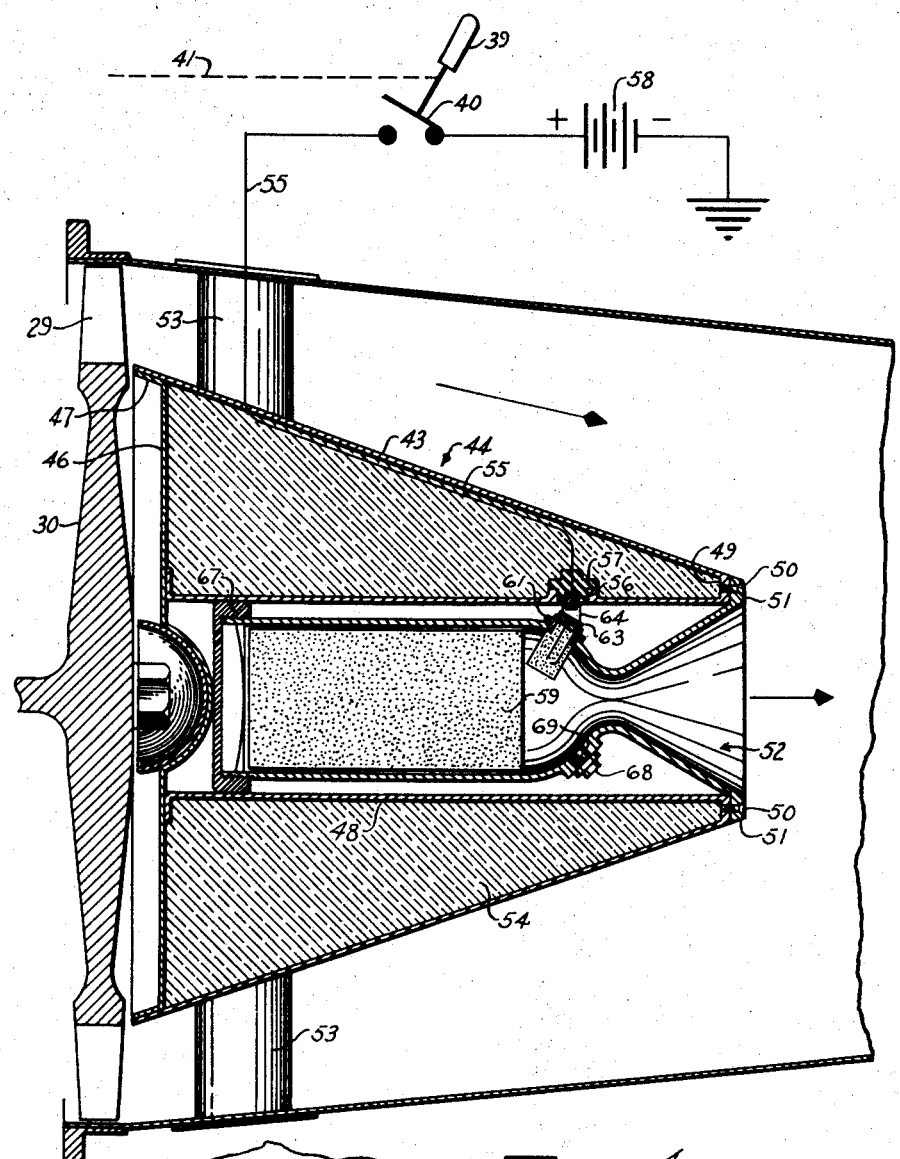
Figure 5:
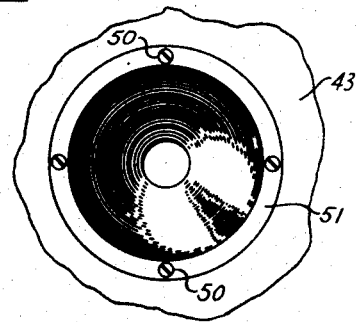

Further objects will become apparent as a description of the engine proceeds. For a better understanding of the invention, reference is made to the accompanying drawings, in which:

Fig. 1 is a view partly diagrammatic and partly in section of a jet engine embodying the invention also showing the nacelle of an airplane, Fig. 2 is a diagrammatic view through the line 2—2 of Fig. 1, Fig. 3 is a sectional view through the line 3—3 of Fig. 1, Fig. 4 is an enlarged view of portion of the turbine, the engine tailpipe with a rocket therein also showing the electrical circuit for firing the rocket, Fig. 5 is a rear view showing the center portion of the rocket mounting of Fig. 4, and Fig. 6 is a sectional view on an enlarged scale showing the rocket firing squib and circuit.

The engine illustrated is of the jet type and comprises an enclosed sheet metal casing 10 which is substantially symmetrical about a horizontal axis 11 of a power shaft 12, the casing having a cylindrical front portion 13, an intermediate cylindrical portion 14 of larger diameter, and a Venturi tube 15 having a constricted circular portion 16 spaced from the downstream end 17 of the casing. At its upstream end the engine has at its center a convex nose 18 which deflects the entering air into an axial multistage air compressor 19 of known type. The rotor 20 of the compressor has secured to its periphery a number of sets of curved blades 21 between which are mounted the sets of stationary blades 22 which are supported at their outer ends by section 13 of the casing. After the compressed air leaves compressor 19, it travels between casing 10 and an interior shell 23 which has an inwardly converging wall portion 24, a cylindrical center wall portion 25 and an outwardly diverging wall 26, the downstream end of which supports a ring of spaced apart turbine stator blades 27 of gas turbine 28. Blades 27 deflect the hot combustion gases against a set of curved turbine blades 29, the latter blades being secured to the periphery of rotor 30 which is attached to the end of shaft 12. It will be understood that shaft 12 is supported for free rotation by spaced apart thrust bearings of any known type (not shown). Eight fuel burners 31 are shown for generating the hot combustion gases which propel the airplane while cruising, these burners being of similar construction and each having a spray nozzle 32 which directs a spray of liquid fuel into a combustion chamber 33 and ignition means (not shown) operable in association with initial supply of the fuel in a well known manner. The wall of this chamber is tapered, as shown, and is provided with a number of small holes 34 which admit the compressed air to the combustion zone in the chamber. Gasoline, kerosene or other liquid fuel is supplied to the nozzles 32 from a circular pipe 35 which encircles casing 10 and is connected to the individual nozzles by short connectors 36. The fuel is supplied from a storage tank (not shown) on the airplane to pipe 35 through a supply pipe 36 and adjustable valve 37 which is opened and closed by rotating a lever 38 through an angle of the order of 90 degrees. Lever 38 is connected with the operating handle 39 of a switch 40 (Fig. 6) by any suitable linkage 41, indicated schematically by the dash line.

The hot gases resulting from the combustion of the fuel impinge against turbine blades 29 whose rotation rotates shaft 12 which drives air compressor 19. After leaving the turbine the hot combustion gases pass through the annular channel 42 lying between converging tube 15 and the frusto-conical peripheral wall 43 of hollow rocket housing 44. From here the gases continue through tube 15 where they are accelerated in accordance with my invention and issue from tube end 17 as a propulsion jet which thrusts the engine forward. This forward thrust is transmitted to the nacelle 45 within which the engine is secured and to the airplane wing or fuselage (not shown) which carries the nacelle in a known manner.

The upstream end of hollow rocket housing 44 (see Fig. 4) is closed by a circular plate 46 having an offset flange 47 hermetically secured to wall 43 and the housing has a cylindrical tube 48 whose upstream end is hermetically secured to plate 46. The downstream end of tube 48 has a vertical annular flange 49 whose periphery is hermetically secured to the downstream end of wall 43. Flange 49 is tapped to receive the threaded ends of three or more screws 50 which pass through an annular flange 51 on the end of rocket 52 and secure the rocket in place. Rocket housing 44 is secured in place by six tubes 53 whose outer ends are fastened to tube 15. Housing 44 is filled with heat insulating material 54 such as asbestos, an insulated wire 55 passing from switch 40 through one of the tubes 53 and terminating in a metal contact 56 carried by a plug 57 made of insulating material and screwed into a threaded hole in tube 48 (see Fig. 6). Current is supplied to contact 56 by any suitable current source, such as a battery 58. The rocket contains a cylindrical propellant charge 59 which is ignited at its rear face by a powder squib 60 comprising a metal collar 61 attached to rocket 52 and having a depending wire 62. Collar 61 has a plug 63 of insulation material seated in its upper end, the plug having a spring attached thereto, the spring having spaced apart leaves 64 adapted to frictionally engage contact 56 when the cartridge is slid forward into the position shown in Fig. 4. The upper end of a wire 65 is attached to spring 64, a spark passing in the gap between the bottom ends of wires 62—65 to ignite the powder 66 in the squib when switch 40 is closed.

At its forward end the cylindrical portion of rocket 52 is externally threaded to receive threaded closure cap 67, whose peripheral face has a sliding fit in tube 48 to guide the rocket as the latter is moved in or out of the tube.

The charge 59 is preferably of the restricted burning type containing potassium perchlorate as an oxidizer and a mixture of asphalt and oil as fuel. The constituents are mixed while hot and the hot black liquid may be cast into a cylindrical mold to provide a solid charge which will enter the rocket when closure cap 67 is removed before the rocket has been put in tube 15. An alternative method for charging the rocket is to unscrew a threaded plug 68 from a threaded opening 69 in the wall of the rocket and pour the hot black liquid through opening 69 while the rocket is resting on closure cap 67 with its axis vertical. A propellant charge of the above composition burns at a rate of substantially 1.5 inches per second so a charge 45 inches long would burn for 30 seconds, the combustion gases issuing from the rocket at a velocity of from 5,000 to 5,600 feet per second.

To start the engine, the airplane pilot moves handle 39, which is located in the cockpit within convenient reach, to close switch 40 and simultaneously open fuel valve 37. The closure of switch 40 causes a spark in the gap between the ends of wires 62 and 65, thereby firing the squib 60 and igniting propellant charge 59. The hot gases from this charge at once commence passing through Venturi tube 15 and issuing from its end 17 to provide a large forward thrust. The hot gases also cause tube 15 to function as a jet pump, causing a large volume of air to be drawn through the compressor and support combustion in the combustion chambers 33. The hot combustion gases at once cause turbine blades 29 to rotate and the gases pass through channel 42 and tube 15 to add to the forward thrust. As the turbine speeds up, air compressor 19 supplies an increasing volume of air to burn the additonal fuel supplied by valve 37 as this valve is further opened by movement of handle 39 toward its final position at which the valve is fully open and the turbine is operating at full speed. During the short interval while the turbine rotor 30 is speeding up, the conical jet 70 (Fig. 1) of combustion gases issuing from rocket 52 at high speed exert a suction effect on the gas in annular channel 42 thus decreasing the back pressure on the turbine blades and increasing the power developed by the engine.

With the usual Jato assist mounted on the airplane at a distance from the engine, the pilot has to manipulate two separate controls to fire the Jato and feed fuel to the engine at starting. With my invention the starting operation is simplified in that the pilot has to move only a single control, 39. This is desirable since any method which decreases the number of controls the pilot has to manipulate at take-off adds to the convenience, speed and safety of take-off.

A further advantage of the invention is that no additional equipment need be provided on the airplane for mounting the rocket 52 which is put in space within frusto-conical wall 43 which would otherwise be wasted. My rocket assist is also of much less weight and less expensive to construct and install than the conventional starting unit which must be carried on the airplane in order to start the turbine away from the home airport.

After the airplane has landed and the engine stopped, the screws 50 are loosened and the empty rocket 52 removed. Another full rocket may immediately be inserted and the screws 50 tightened whereupon the engine may be restarted upon the pilot's moving handle 39 to restart the engine in the manner above described.

This invention may be embodied in other forms or carried out in other ways without departing from the spirit or essential characteristics thereof. The present embodiment of the invention is therefore to be considered as in all respects illustrated and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. An engine adapted to generate a gaseous jet of high velocity comprising, in combination: a long tubular enclosing casing having an inwardly converging outlet portion terminating in a discharge orifice, the length of said converging portion being substantially greater than the diameter of said discharge orifice; a gas turbine mounted in said casing and having a rotor rotatable about an axis in alignment with said discharge orifice; a set of spaced apart turbine blades attached to the periphery of said rotor; a plurality of fuel burners including spray nozzles in said casing upstream of said turbine blades; a conduit connected to said nozzles to supply liquid fuel thereto; a valve in said conduit to regulate the flow of fuel to said nozzles; a long mass of restricted burning solid propellant within the converging portion of said casing and in alignment with the axis of said rotor, the downstream end of said propellant being spaced a substantial distance upstream from said discharge orifice; a container surrounding said propellant mass and having an outlet portion constructed to direct the hot gas generated by the combustion of said propellant toward said discharge orifice at high velocity; electrically operated means for igniting said propellant at the downstream end thereof; an electrical circuit including a switch connected to energize said electrically operated means; and a movable control member operatively connected to said switch and valve and constructed to open said valve and close said switch in response to movement of said control member in one direction.

2. A gas turbine having a rotor provided with a set of rotor blades, a set of fuel burners including spray nozzles disposed upstream from said blades and means for supplying liquid fuel to said nozzles; a long tubular casing enclosing said rotor blades and nozzles, said casing having a long inwardly tapering portion which terminates at its downstream end in a constricted discharge orifice in alignment with said rotor; a hollow rocket housing within the tapering portion of said casing and supported thereby, said rocket housing having a long interior wall concentric with the axis of said rotor; a long hollow metallic container insertable through said discharge orifice and having its major portion disposed within said interior wall, said container being readily attachable to and detachable from said rocket housing through said orifice and having a solid closure member secured across its upstream end; a long mass of restricted burning solid propellant within said container for generating a jet of hot combustion gas having a velocity greater than 3,000 feet per second, said container having at its downstream end a flared portion spaced upstream from said discharge orifice by a distance at least twice the diameter of said discharge orifice, said flared portion being shaped to direct said jet of hot gas directly toward said discharge orifice.

3. A turbine as claimed in claim 2, in which said solid closure member has a peripheral face in sliding contact with the inner face of said interior wall to guide said metallic container upstream into said rocket housing.

4. A turbine as claimed in claim 2 in which said rocket housing is provided with an inwardly sloping exterior conical wall whose distance from the tapering portion of said tubular casing progressively increases as said discharge orifice is approached; and a mass of heat insulating material substantially filling the space between said conical wall and the long interior wall of said rocket housing.

5. An engine as claimed in claim 1 and further comprising a compressor coupled to said turbine for rotation therewith and having a large volume of air drawn therethrough and into said burners by jet pump action of said high velocity gas, said valve being constructed on opening to supply fuel for combustion with said volume of air to generate hot gases to drive said turbine and compressor and on further opening of the valve after closing of the switch to provide additional fuel to said burners for combustion with the increased volume of air supplied thereto by said compressor.

References Cited in the file of this patent

UNITED STATES PATENTS

| | | |
|---|---|---|
| 2,399,542 | Collins | Apr. 30, 1946 |
| 2,411,552 | New | Nov. 26, 1946 |
| 2,422,744 | O'Neil | June 24, 1947 |
| 2,440,305 | Skinner | Apr. 27, 1948 |
| 2,610,464 | Knoll | Sept. 16, 1952 |
| 2,645,999 | Bogard | July 21, 1953 |
| 2,676,457 | Kramer | Apr. 27, 1954 |
| 2,695,366 | Coffey | Nov. 23, 1954 |
| 2,735,263 | Charshafian | Feb. 21, 1956 |
| 2,769,305 | Chernowitz | Nov. 6, 1956 |

FOREIGN PATENTS

| | | |
|---|---|---|
| 1,075,034 | France | Apr. 7, 1954 |
| 622,029 | Great Britain | Apr. 26, 1949 |